United States Patent

Sekioka et al.

[11] Patent Number: 5,304,222
[45] Date of Patent: Apr. 19, 1994

[54] MONOAZO BENZOTHIAZOLE DISPERSE DYE MIXTURE

[75] Inventors: Ryouichi Sekioka; Kouichi Seto, both of Kitakyushu, Japan

[73] Assignee: Hoechst Mitsubishi Kasei Co., Ltd., Tokyo, Japan

[21] Appl. No.: 899,701

[22] Filed: Jun. 17, 1992

[30] Foreign Application Priority Data

Jun. 18, 1991 [JP] Japan ............... 3-146314

[51] Int. Cl.$^5$ ............... C09B 29/045; C09B 67/22; C09B 67/48; C09B 67/38
[52] U.S. Cl. ............... 8/639; 534/573; 534/788; 534/856
[58] Field of Search ............... 534/573 M, 856, 788; 8/639

[56] References Cited

U.S. PATENT DOCUMENTS

| | | | |
|---|---|---|---|
| 3,337,522 | 8/1967 | Wegmuller | 534/573 M |
| 4,734,101 | 3/1988 | Himeno et al. | 8/524 |

FOREIGN PATENT DOCUMENTS

| | | | |
|---|---|---|---|
| 0228092A3 | 7/1987 | European Pat. Off. | 534/573 |
| 1544451 | 10/1965 | Fed. Rep. of Germany | 534/573 |
| 2389707 | 1/1978 | France | 535/573 |
| 44-09758 | 5/1969 | Japan | 534/856 |
| 44-30628 | 12/1969 | Japan | 534/575 |
| 1123108 | 8/1968 | United Kingdom | 534/856 |
| 1324235 | 7/1973 | United Kingdom | 534/575 |

OTHER PUBLICATIONS

M. F. Satori, J. Soc. Dyers and Colourists, vol. 83, No. 4, Apr. 1967, Bradford, pp. 144–146, "Spectral and Fastness Properties of Benzothiazolylazo Dyes".
Chemical Abstracts, vol. 110, No. 7, Apr. 3, 1989, Columbus, Ohio, Abstract No. 116585p, p. 90 & JP-A-63 135 578 (Mitsubishi) Jun. 7, 1988 Himeno et al II.
Patent Abstracts of Japan, vol. 12, No. 421 (C-541) (3268, Nov. 8, 1988 Himeno.
Chemical Abstracts, vol. 109, No. 24, Dec. 1988, Columbus, Ohio, Abstract No. 212334, p. 63, and JP-A-63 152 669 (Mitsubishi), Jun. 25, 1988 Himeno et al III.

*Primary Examiner*—Floyd D. Higel
*Attorney, Agent, or Firm*—Oblon, Spivak, McClelland, Maier & Neustadt

[57] ABSTRACT

A disperse dye mixture comprising from 20 to 80% by weight of a red disperse dye of the following formula (A) and from 20 to 80% by weight of a red disperse dye of the following formula (B):

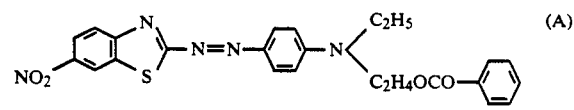

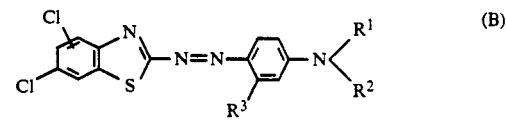

wherein $R^1$ is $-C_2H_5$ or $-C_2H_4OCOCH_3$, $R^2$ is $-C_2H_4OCOCH_3$ or $-C_2H_4CN$, and $R^3$ is hydrogen or $-CH_3$.

4 Claims, No Drawings

MONOAZO BENZOTHIAZOLE DISPERSE DYE MIXTURE

The present invention relates to a disperse dye mixture. More particularly, it relates to a red disperse dye mixture which is excellent not only in the wet fastness but also in the dyeing affinity, temperature dependency, pH dependency and high temperature dispersibility during dyeing and which has a color hue similar to C.I. Disperse Red 73.

Heretofore, C.I. Disperse Red 73 has been known as a red dye excellent in the high temperature dyeing properties, but it is inferior in the pH dependency, and the wet fastness of the dyed product is inferior. Therefore, a red dye free from such drawbacks has been desired.

On the other hand, a red disperse dye of the following formula (A):

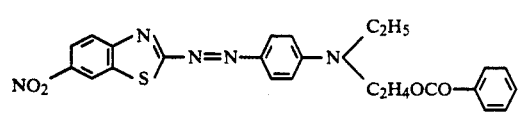

has been known as a dye excellent in the wet fastness when polyester fibers are dyed therewith. However, this disperse dye is not fully satisfactory with respect to the dyeing affinity, temperature dependency and high temperature dispersibility at the time of deep color dyeing. Besides, the color hue tends to be bluish, and the useful range as a common red dye is rather limited.

It is an object of the present invention to provide a red disperse dye which has the excellent wet fastness of the red disperse dye of the above formula (A) and has the dyeing affinity, temperature dependency and high temperature dispersibility improved and which has a color hue similar to C.I. Disperse Red 73.

Under these circumstances, the present inventors have conducted extensive researches and have found that when the dye of the above formula (A) and a dye having a specific structure are used in combination, the dyeing properties can be improved remarkably as compared with the respective single use.

Thus, the present invention provides a disperse dye mixture comprising from 20 to 80% by weight of a red disperse dye of the following formula (A) and from 20 to 80% by weight of a red disperse dye of the following formula (B):

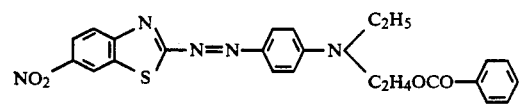

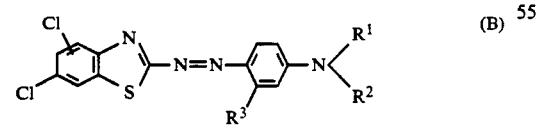

wherein $R^1$ is $-C_2H_5$ or $-C_2H_4OCOCH_3$, $R^2$ is $-C_2H_4OCOCH_3$ or $-C_2H_4CN$, and $R^3$ is hydrogen or $-CH_3$.

Now, the present invention will be described in detail with reference to the preferred embodiments.

The dyes of the above formulas (A) and (B) are per se known, for example, in U.K. Patent No. 1324235 or Japanese Examined Patent Publication No. 30628/1969.

In the present invention, the disperse dyes of the above formulas (A) and (B) are mixed, and the blend ratio is selected within a range of (A):(B)=80 to 20 wt %:20 to 80 wt % in the disperse dye mixture. A preferred blend ratio is such that component (B) is from 0.2 to 3 times by weight, more preferably from 0.2 to 2 times by weight, relative to component (A). If the amount of component (B) is too small or too large, the effects for improvement of the dyeing affinity, temperature dependency, high temperature dispersibility, etc. tend to be inadequate, and the color hue tends to be hardly similar to C.I. Disperse Red 73 having good high temperature dyeing properties, and the composition tends to be poor in the general use. To the disperse dye mixture of the present invention, other dyes may be incorporated to such an extent that the essential properties will not be impaired. The blending proportion of such other dyes to be incorporated is not more than equal by weight to the mixture of components (A) and (B).

If the proportion of other dyes to be incorporated exceeds this range, the wet fastness, sublimation fastness, high temperature dispersibility, etc. tend to be impaired, such being undesirable.

Other dyes to be incorporated include, for example, known dyes represented by the following formulas (C) and (D)

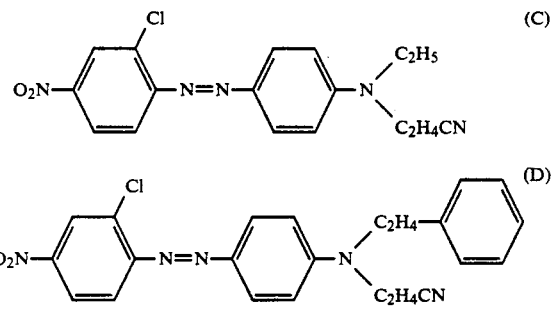

The disperse dye of the formula (A) to be used in the present invention, can readily be produced by a conventional method, for example, by diazotizing 2-amino-6-nitrobenzothiazole, followed by coupling with N-ethyl-N-benzyloxyethylaniline.

The disperse dye of the above formula (B) can readily be produced, for example, by diazotizing an aniline derivative of the following formula:

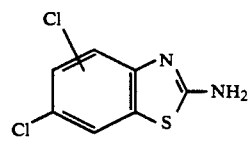

followed by coupling with a compound of the following formula:

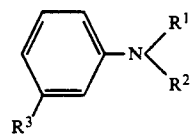

wherein $R^1$, $R^2$ and $R^3$ are as defined above.

Further, the dye of the formula (C) can readily be produced, for example, by diazotizing 2-chloro 4-nitroaniline, followed by coupling with N-ethyl-N-cyanoethylaniline.

The dye of the formula (D) can readily be produced, for example, by diazotizing 2-chloro-4-nitroaniline, followed by coupling with N-phenethyl-N-cyanoethylaniline.

To use the disperse dye mixture of the present invention, it is mixed with a known anion dispersant such as a naphthalene sulfonic acid-formalin condensation product or a lignin sulfonic acid-formalin condensation product in accordance with a conventional method, and the resulting dye cake is subjected to dispersing treatment to obtain a disperse dye composition.

The disperse dye mixture of the present invention is used primarily for dyeing polyester fibers. The polyester fibers may be employed alone or in combination with other fibers.

Various methods may be employed for dyeing. However, when applied to an exhaustion dyeing method, the present invention provides excellent dyeing affinity and temperature dependency as well as pH dependency. There is no particular restriction as to the dyeing conditions for exhaustion dyeing. However, dyeing temperature is, for example, from 95° to 140° C., and the dyeing bath has a pH of from 4 to 9.5.

The disperse dye mixture of the present invention has a color hue similar to C.I. Disperse Red 73 and is excellent not only in the wet fastness but also in the dyeing affinity, temperature dependency, pH dependency and high temperature dispersibility, and thus it is useful particularly as a dye for polyester fibers.

Now, the present invention will be described in further detail with reference to Examples. However, it should be understood that the present invention is by no means restricted to such specific Examples.

REFERENCE EXAMPLE

Preparation of the Respective Disperse Dyes (1) 23 g of the disperse dye of the above formula (A) was pulverized in a wet system for 5 hours together with 77 g of a lignin sulfonic acid-formalin condensation product and 300 g of water by a sand grinder, followed by spray drying to obtain a powdery dye composition (A).

(2) 34 g of a disperse dye (B-1) as identified in the following Table 1 was pulverized in a wet system for 5 hours together with 40 g of a lignin sulfonic acid-formalin condensation product, 26 g of a naphthalene sulfonic acid-formalin condensation product and 300 g of water by a sand grinder, followed by spray drying to obtain a powdery dye composition (B-1).

(3) 34 g of a disperse dye (B-2) as identified in the following Table 1, was pulverized in wet system for 5 hours together with 43 g of a lignin sulfonic acid-formalin condensation product, 23 g of a naphthalene sulfonic acid-formalin condensation product and 300 g of water by a sand grinder, followed by spray drying to obtain a powdery dye composition (B-2).

(4) 34 g of a disperse dye (B-3) as identified in the following Table 1, was pulverized in wet system for 5 hours together with 43 g of a lignin sulfonic acid-formalin condensation product, 23 g of a naphthalene sulfonic acid-formalin condensation product and 300 g of water by a sand grinder, followed by spray drying to obtain a powdery dye composition (B-3).

TABLE 1

(Structure B: dichloro-benzothiazole-N=N-phenyl with substituents $R^1$, $R^2$, $R^3$)

| No. | $R^1$ | $R^2$ | $R^3$ |
|---|---|---|---|
| (B-1) | $C_2H_5$ | $C_2H_4OCOCH_3$ | H |
| (B-2) | $C_2H_4OCOCH_3$ | $C_2H_4OCOCH_3$ | H |
| (B-3) | $C_2H_5$ | $C_2H_4CN$ | $CH_3$ |

(5) 26 g of the disperse dye of the above formula (C) was pulverized in wet system for 5 hours together with 10 g of a lignin sulfonic acid-formalin condensation product, 32 g of a cresol-formalin condensation product, 32 g of a naphthalene sulfonic acid-formalin condensation product and 300 g of water by sand grinder, followed by spray drying to obtain a powdery disperse dye composition (C).

(6) 32 g of the disperse dye of the above formula (D) was pulverized in a wet system for 5 hours together with 10 g of a lignin sulfonic acid-formalin condensation product, 32 g of a cresol-formalin condensation product, 26 g of a naphthalene sulfonic acid-formalin condensation product and 300 g of water by a sand grinder, followed by spray drying to obtain a powdery disperse dye composition (D).

EXAMPLES 1 to 5 and COMPARATIVE EXAMPLES 1 to 9

The disperse dye compositions (A) and (B-1) to (B-3) prepared in Reference Example were blended in the proportions as identified in Table 2 to obtain dye mixtures. Using such dye mixtures, cloths were dyed and evaluated in accordance with the following methods. The results are shown in Table 2.

Dyeing Method-high Temperature Dyeing

A polyester spun-cloth was dyed at a dyeing concentration of 1/1N, 2/1N or 1/3N at a bath ratio of 1:20 at 135° C. for 30 minutes using a dyeing bath containing 1 g/l of an anion leveling agent and adjusted to pH 5.0±0.5 by acetic acid and sodium acetate. The dyed cloth thereby obtained was subjected to reduction cleaning at 80° C. for 10 minutes by means of 2 g/l of sodium hydroxide, 2 g/l of hydrosulfite and 1 g/l of a special anion-nonion surfactant.

Evaluation Method (1) Percentage Exhaustion

Using the dyed cloth obtained by high temperature dyeing at a dyeing concentration of 2/1N, the tinted dye was extracted with dimethylformamide acidified by phosphoric acid, and the OD value (optical density) at 80% acetone was measured, and the percentage exhaustion was obtained.

(2) Temperature Dependency

The surface densities of the cloths dyed at dyeing temperatures of 135° C., and 120° C., respectively, at a dyeing concentration of 2/1N by high temperature dyeing, were measured, and the temperature dependency was evaluated in accordance with the following formula. Temperature dependency = (surface density of the cloth dyed at a dyeing temperature of 120° C./surface density of the cloth dyed at a dyeing temperature of 130° C.)×100 (%)

(3) pH Dependency

The surface densities of the cloths dyed at a dyeing density of 1/3N by high temperature dyeing at pH 5 and 9.5, respectively, were measured, and the pH dependency was evaluated in accordance with the following formula.

pH dependency=(surface density of the cloth dyed at pH 9.5/surface density of the cloth at pH 5)×100 (%)

(4) Wet Fastness

① Washing Fastness

A cloth dyed at a dyeing concentration of 2/1N by the above high temperature dyeing, was heat-set at 180° C. for one minute and then treated in accordance with AATCC II-A method, and the degree of staining of a nylon white cloth was evaluated.

② Alkali Perspiration Fastness

A cloth dyed at a dyeing concentration of 2/1N by the above high temperature dyeing, was heat-set at 180° C. for one minute and then treated in accordance with JIS L0848 method A, and the degree of staining of a nylon white cloth was evaluated.

(5) Sublimation Fastness

A cloth dyed at a dyeing concentration of 1/1N by the above high temperature dyeing, was treated and evaluated in accordance with JIS L0879-1968.

(6) High Temperature Filtration Test (High Temperature Dispersibility)

200 ml of a dyeing bath containing 1.6 g of a dye and 1 g/l of a leveling agent and adjusted to pH 5 by ammonium sulfate and acetic acid (corresponding to dyeing conditions such that the dyeing bath ratio is 1:10 and a dyeing concentration of 4/1N), was boiled at 130° C. for 60 minutes. After cooling, it was separated into portions of 100 ml each at 90° C., which were filtered under suction through a cotton broad cloth #40 (70 mm in diameter) and Toyo filter paper No. 5-A (70 mm in diameter), whereupon the amounts of the colorants remaining on the filter materials were visually evaluated in accordance with the following standards:

Grade 3 (good): No colorant remained on the filter material

Grade 2 (slightly poor): Some colorant remained on the filter material

Grade 1 (poor): Colorant remained on the filter material in a substantial amount.

TABLE 2

| No. | Blend components and blend ratios | Degree of exhaustion (%) | Temperature dependency (%) | pH Dependency (%) | Wet fastness Washing (grade) | Alkali perspiration (grade) | Sublimation fastness (grade) | High temperature dispersibility (grade) |
| --- | --- | --- | --- | --- | --- | --- | --- | --- |
| Example 1 | (A)/(B-1) = 50/50 | 98 | 80 | 100 | 3-4 | 4-5 | 4 | 3 |
| Example 2 | (A)/(B-2) = 50/50 | 98 | 80 | 99 | 3-4 | 4 | 4-5 | 3 |
| Example 3 | (A)/(B-3) = 40/60 | 98 | 80 | 100 | 3-4 | 4 | 4-5 | 3 |
| Example 4 | (A)/(B-1)/(B-2) = 60/20/20 | 99 | 85 | 100 | 3-4 | 4-5 | 4-5 | 3 |
| Example 5 | (A)/(B-1)/(B-3) = 50/25/25 | 99 | 85 | 100 | 3-4 | 4 | 4 | 3 |
| Comparative Example 1 | C.I. Disperse Red 73 | 93 | 60 | 20 | 2 | 2-3 | 3-4 | 3 |
| Comparative Example 2 | (A) | 60 | 20 | 100 | 4 | 5 | 5 | 1 |
| Comparative Example 3 | (B-1) | 95 | 50 | 98 | 3 | 4 | 3-4 | 2 |
| Comparative Example 4 | (B-2) | 94 | 40 | 95 | 3 | 3-4 | 4-5 | 2 |
| Comparative Example 5 | (B-3) | 90 | 25 | 100 | 3 | 3-4 | 4 | 2 |
| Comparative Example 6 | (A)/(B-1) = 90/10 | 70 | 30 | 100 | 4 | 4-5 | 4-5 | 1 |
| Comparative Example 7 | (A)/(B-1) = 10/90 | 97 | 90 | 98 | 3 | 4 | 3-4 | 2 |
| Comparative Example 8 | (A)/(B-2) = 10/90 | 95 | 80 | 95 | 3 | 3-4 | 4-5 | 2 |
| Comparative Example 9 | (A)/(B-3) = 90/10 | 68 | 30 | 100 | 4 | 4-5 | 5 | 1 |

EXAMPLES 6 to 12 and COMPARATIVE EXAMPLES 10 to 13

Using dye mixtures obtained by blending disperse dye compositions (A), (B-1) to (B-3), (C) and (D) prepared in the Reference Example in the proportions as identified in Table 3, dyeing and evaluation were conducted in the same manner as in Examples 1 to 5 and Comparative Examples 1 to 9. The results are shown in Table 3.

TABLE 3

| No. | Blend components and blend ratios | Degree of exhaustion (%) | Temperature dependency (%) | pH Dependency (%) | Wet fastness Washing (grade) | Alkali perspiration (grade) | Sublimation fastness (grade) | High temperature dispersibility (grade) |
| --- | --- | --- | --- | --- | --- | --- | --- | --- |
| Example 6 | (A)/(B-1)/(C) = | 99 | 95 | 100 | 3-4 | 4 | 3-4 | 3 |

TABLE 3-continued

| No. | Blend components and blend ratios | Degree of exhaustion (%) | Temperature dependency (%) | pH Dependency (%) | Wet fastness Washing (grade) | Wet fastness Alkali perspiration (grade) | Sublimation fastness (grade) | High temperature dispersibility (grade) |
|---|---|---|---|---|---|---|---|---|
| Example 7 | (A)/(B-2)/(C) = 34/33/33 | 99 | 95 | 100 | 3-4 | 4 | 4 | 3 |
| Example 8 | (A)/(B-1)/(C) = 45/25/30 | 99 | 95 | 100 | 3-4 | 4 | 3-4 | 3 |
| Example 9 | (A)/(B-2)/(C) = 50/30/20 | 98 | 94 | 99 | 3-4 | 4 | 4 | 3 |
| Example 10 | (A)/(B-3)/(C) = 45/25/30 | 98 | 95 | 100 | 3-4 | 4 | 4 | 3 |
| Example 11 | (A)/(B-1)/(D) = 34/33/33 | 98 | 95 | 100 | 3-4 | 4 | 4 | 3 |
| Example 12 | (A)/(B-2)/(D) = 34/33/33 | 98 | 95 | 100 | 3-4 | 4 | 4 | 3 |
| Comparative Example 10 | (C) | 94 | 65 | 100 | 2 | 3-4 | 3 | 1 |
| Comparative Example 11 | (D) | 93 | 50 | 100 | 3-4 | 4 | 4 | 1 |
| Comparative Example 12 | (A)/(B-1)/(C) = 10/10/80 | 99 | 95 | 100 | 2 | 3-4 | 3 | 1 |
| Comparative Example 13 | (A)/(B-3)/(C) = 15/15/70 | 99 | 95 | 100 | 2 | 3-4 | 3 | 1 |

We claim:

1. A disperse dye mixture comprising from 20 to 80% by weight of a red disperse dye of the following formula (A) and from 20 to 80% by weight of a red disperse dye of the following formula (B):

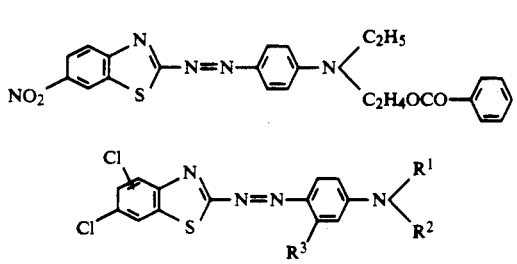

wherein $R^1$ is $-C_2H_5$ or $-C_2H_4OCOCH_3$, $R^2$ is $-C_2H_4OCOCH_3$ or $-C_2H_4CN$, and $R^3$ is hydrogen or $-CH_3$.

2. The disperse dye mixture according to claim 1, wherein in the formula (B), $R^1$ is $-C_2H_5$, $R^2$ is $-C_2H_4OCOCH_3$, and $R^3$ is hydrogen.

3. The disperse dye mixture according to claim 1, which further contains a dye of the following formula (C) in an amount at most equal by weight to the total amount of components (A) and (B):

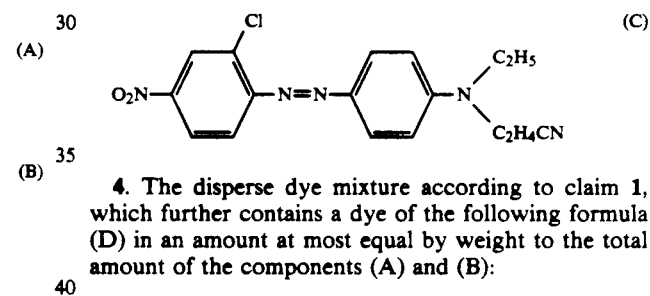

4. The disperse dye mixture according to claim 1, which further contains a dye of the following formula (D) in an amount at most equal by weight to the total amount of the components (A) and (B):

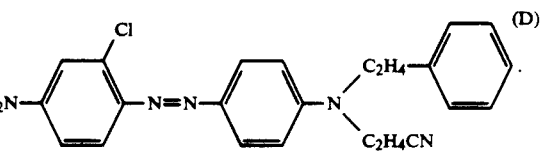

* * * * *